US 6,487,538 B1
Nov. 26, 2002

(54) METHOD AND APPARATUS FOR LOCAL ADVERTISING

(75) Inventors: Amit Gupta, Fremont, CA (US); Sriraman Venkataraman, London (GB); Geoffrey Baehr, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/192,874

(22) Filed: Nov. 16, 1998

(51) Int. Cl.[7] ............................................... G06F 17/60
(52) U.S. Cl. ......................................... 705/14; 709/219
(58) Field of Search ............................ 705/14; 709/219, 709/218

(56) References Cited

U.S. PATENT DOCUMENTS

| | | | | |
|---|---|---|---|---|
| 5,305,195 A | * | 4/1994 | Murphy ........................ | 705/14 |
| 5,347,632 A | * | 9/1994 | Filepp et al. .................. | 705/14 |
| 5,530,759 A | | 6/1996 | Braudaway et al. | |
| 5,544,302 A | | 8/1996 | Nguyen | |
| 5,721,827 A | * | 2/1998 | Logan et al. .................. | 705/14 |
| 5,724,521 A | * | 3/1998 | Dedrick ........................ | 705/14 |
| 5,737,619 A | * | 4/1998 | Judson ........................ | 705/14 |
| 5,740,252 A | | 4/1998 | Minor et al. | |
| 5,740,549 A | * | 4/1998 | Reilly et al. .................. | 705/14 |
| 5,754,938 A | | 5/1998 | Herz et al. | |
| 5,761,662 A | | 6/1998 | Dasan | |
| 5,794,210 A | * | 8/1998 | Goldhaber et al. ........... | 705/10 |
| 5,802,320 A | | 9/1998 | Baehr et al. | |
| 5,848,397 A | * | 12/1998 | Marsh et al. .................. | 705/14 |
| 5,855,008 A | * | 12/1998 | Goldhaber et al. ........... | 705/10 |
| 5,878,231 A | | 3/1999 | Baehr et al. | |
| 5,884,025 A | | 3/1999 | Baehr et al. | |
| 5,905,800 A | | 5/1999 | Moskowitz et al. | |

(List continued on next page.)

FOREIGN PATENT DOCUMENTS

| | | | |
|---|---|---|---|
| EP | 0749081 A1 | * | 10/1996 |
| WO | WO9707656 | * | 3/1997 |
| WO | WO9834189 | * | 6/1998 |

OTHER PUBLICATIONS

Doubleclick, Inc., "DoubleClick DART Selected by Asia–Pacific's Premier Advertising Agencies," DoubleClick—The Global Internet Advertising Solutions Company, {http://www.doubleclick.com} (visited Sep. 12, 2000).

(List continued on next page.)

Primary Examiner—Kyle J. Choi
Assistant Examiner—Romain Jeanty
(74) Attorney, Agent, or Firm—Gunnison, McKay & Hodgson, L.L.P.; Philip J. McKay

(57) ABSTRACT

A method and apparatus for local advertising. Internet Service Providers (ISPs) or proxies owned by an ISP insert advertisements transmitted from a web host to a client. The advertisement may be stored in the proxy's cache or may be retrieved from a web server for an advertiser. By providing the ISP with the ability to insert the advertisement, advertisements appear on small web sites that do not normally attract advertisers. Additionally, due to the number of advertisements placed by an ISP, small advertisers may have their advertisement appear in connection with frequently used web sites. One or more embodiments of the invention provide for an ISP to collect and store demographic information such as the user's age, residence, credit history, etc. Additionally, stored information may include web sites the user has accessed, time spent on each web site, and any searches performed by the user. The profile information may be utilized by the proxy to conduct targeted advertising and to associate a cost with certain demographic information. The profile information may be evaluated by the ISP for advertisement insertion. Alternatively, the profile information may be forwarded to an advertiser or advertising agency that evaluates and forwards back an advertisement for the proxy to transmit to the user.

70 Claims, 5 Drawing Sheets

U.S. PATENT DOCUMENTS

| | | | |
|---|---|---|---|
| 5,944,791 A | | 8/1999 | Scherpbier |
| 5,948,061 A | | 9/1999 | Merriman et al. |
| 5,974,451 A | * | 10/1999 | Simmons ............... 705/14 |
| 5,983,227 A | | 11/1999 | Nazem et al. |
| 6,009,409 A | * | 12/1999 | Adler et al. ............ 705/14 |
| 6,014,502 A | * | 1/2000 | Moraes ................. 705/14 |
| 6,014,638 A | | 1/2000 | Burge et al. |
| 6,016,509 A | * | 1/2000 | Dedrick ................ 705/14 |
| 6,020,884 A | | 2/2000 | MacNaughton et al. |
| 6,029,195 A | * | 2/2000 | Herz .................... 707/10 |
| 6,119,098 A | * | 9/2000 | Guyot et al. ........... 705/14 |
| 6,285,987 B1 | * | 9/2001 | Roth et al. ............. 705/10 |

OTHER PUBLICATIONS

Doubleclick, Inc., "Solutions for Advertisers—Global, International, DoubleClick," {http://www.doubleclick.com:8080/advertisers/} (visited Sep. 12, 2000).

Doubleclick, Inc., "Brand Building and Driving Sales," DoubleClick Network—The Global Internet Advertising Solutions Company, {http://www.doubleclick.com:8080/advertisers/network} (visited Sep. 12, 2000).

Doubleclick, Inc., "DART Service Solution," DoubleClick Ad Management Technology—The Global Internet Advertising Solutions Co., {http://www.doubleclick.com:8080/publishers/service/} (visited Sep. 12, 2000).

Doubleclick, Inc., "DoubleClick Targeting—The Global Internet Advertising Solutions Company," {http://www.doubleclick.com:8080/publishers/service/benefits/targeting.htm} (visited Sep. 12, 2000).

Doubleclick, Inc., "TechSolutions for Advertisers," {http://www.doubleclick.com:8080/advertisers/techsolutions/} (visited Sep. 12, 2000).

Doubleclick, Inc., "DoubleClick DART for Advertisers," {http://www.doubleclick.com:8080/advertisers/techsolutions/dfa.htm} (visited Sep. 12, 2000).

Doubleclick, Inc., "DoubleClick DART Analyzer," {http://www.doubleclick.com:8080/advertisers/techsolutions/analyzer.htm} (visited Sep. 12, 2000).

Doubleclick, Inc., "DoubleClick Solutions for Publishers—The Global Internet Advertising Solutions Company," {http://www.doubleclick.com:8080/publishers/} (visited Sep. 12, 2000).

Doubleclick, Inc., "DoubleClick Select—The Global Internet Advertising Solutions Company," {http://www.doubleclick.com:8080/publishers/outsourcing/select.htm} (visited Sep. 12, 2000).

Doubleclick, Inc., "DoubleClick Network—The Global Internet Advertising Solutions Company," {http://www.doubleclick.com:8080/publishers/network/} (visited Sep. 12, 2000).

Doubleclick, Inc., "AdServer Software Solution," Doubleclick Ad Management Software—The Global Internet Advertising Solutions Comp., {http://www.doubleclick.com:8080/publishers/software/} (visited Sep. 12, 2000).

Doubleclick, Inc., "Software or Service? Making the Right Choice," DoubleClick Solutions for Publishers—The Global Internet Advertising Solutions Company, {http://www-.doubleclick.com:8080/publishers/choices.htm} (visited Sep. 12, 2000).

Pei Cao, Jin Zhang and Kevin Beach, *Active Cache: Caching Dynamic Contents on the Web,* University of Wisconsin–Madison, Computer Sciences Department, University of Wisconsin–Madison, Madison, WI 53705, USA.

McCandless, M., *"Web Advertising,"* IEEE Intelligent Systems [see also IEEE Expert] May–Jun. 1998, vol. 13, Issue 3, pp. 8–9.

Gallagher, K. and Parsons, J., *"A Framework for Targeting Banner Advertising On the Internet,"* Proceedings of the Thirtieth Hawaii International Conference on System Sciences, 1997 (conference held Jan. 7–10, 1997), vol. 4, pp. 265–274.

Little, T.D.C., *"Commerce on the Internet,"* IEEE Multimedia, Winter 1994, vol. 1, Issue 4, pp. 74–78.

\* cited by examiner

METHOD AND APPARATUS FOR LOCAL ADVERTISING

BACKGROUND OF THE INVENTION

1. Field of the Invention

This invention relates to the field of computer software, and, more specifically, to advertising on the internet.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views and all Java-based trademarks and logos are trademarks or registered trademarks of Sun Microsystems, Inc. in the United States and other countries.

2. Background Art

In a computer network environment and the internet, advertising is increasingly utilized by owners of web sites (referred to as web hosts) as a revenue source and for the advertisers to gain publicity and web site access. Web hosts sell advertising space on their web site and distribute web pages including the advertisements to internet users or clients. It is desirable for advertisements to target specific audiences and persons that may be interested in the specific good or service being advertised. Prior art advertising schemes poorly target audiences and create excessive internet traffic when retrieving and transmitting advertisements. These problems can be understood by reviewing networks, internets, advertising and how they work.

Networks

In modern computing environments, it is commonplace to employ multiple computers or workstations linked together in a network to communicate between, and share data with, network users. A network also may include resources, such as printers, modems, file servers, etc., and may also include services, such as electronic mail.

A network can be a small system that is physically connected by cables (a local area network or "LAN"), or several separate networks can be connected together to form a larger network (a wide area network or "WAN"). Other types of networks include the internet, tel-com networks, the World Wide Web, intranets, extranets, wireless networks, and other networks over which electronic, digital, and/or analog data may be communicated.

Computer systems sometimes rely on a server computer system to provide information to requesting computers on a network. When there are a large number of requesting computers, it may be necessary to have more than one server computer system to handle the requests.

The Internet

The Internet is a worldwide network of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, read information from, download a file from or send an electronic mail message to another computer/client using the Internet.

To retrieve a file or service on the Internet, a client must search for the file or service, make a connection to the computer on which the file or service is stored, and download the file or service. Each of these steps may involve a separate application and access to multiple, dissimilar computer systems. The World Wide Web (WWW) was developed to provide a simpler, more uniform means for accessing information on the Internet.

The components of the WWW include browser software, network links, servers. and WWW protocols. The browser software, or browser, is a user-friendly interface (i.e., frontend) that simplifies access to the Internet. A browser allows a client to communicate a request without having to learn a complicated command syntax, for example. A browser typically provides a graphical user interface (GUI) for displaying information and receiving input. Examples of browsers currently available include Mosaic, Netscape Navigator and Communicator, Microsoft Internet Explorer, and Cello.

Information servers maintain the information on the WWW and are capable of processing a client request. Hypertext Transport Protocol (HTTP) is the standard protocol for communication with an information server on the WWW. HTTP has communication methods that allow clients to request data from a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request therefore, consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independent of any other request. The server has no recollection of any previous request.

Instead of transmitting the information from the server that maintains the information, some systems utilize what is referred to as a proxy. Referring to FIG. 1, a proxy 102 is a server that carries out requests transmitted to it (i.e., from client 100), keeping copies of fetched documents or information for some time so that they can be accessed more quickly in the future, speeding up access for commonly requested information. This maintaining of information and fetched documents by the proxy 102 is referred to as caching and the information maintained in the proxy 102 is referred to as a cache or proxy cache.

To protect information in internal computer networks from external access, a firewall is utilized. A firewall is a mechanism that blocks access between the client and the server. To provide limited access to information, a proxy or proxy server may sit atop a firewall and act as a conduit, providing a specific connection for each network connection. Proxy software retains the ability to communicate with external sources, yet is trusted to communicate with the internal network. For example, proxy software may require a username and password to access certain sections of the internal network and completely block other sections from any external access.

An addressing scheme is employed to identify Internet resources (e.g., HTTP server, file or program). This addressing scheme is called Uniform Resource Locator (URL). A URL contains the protocol to use when accessing the server (e.g., HTTP), the Internet domain name of the site on which the server is running, the port number of the server, and the location of the resource in the file structure of the server.

The WWW uses a concept known as hypertext. Hypertext provides the ability to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to gateway programs. The Common Gateway Interface (CGI) specification defines a mechanism by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard input, for example). The server forwards the data to the client using the HTTP.

A browser displays information to a client/user as pages or documents (referred to as "web pages" or "web sites"). A language is used to define the format for a page to be displayed in the WWW. The language is called Hypertext Markup Language (HTML). A WWW page is transmitted to a client as an HTML document. The browser executing at the client parses the document and displays a page based on the information in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. An element can have attributes that specify properties of the element. Blocks or components include unordered list, text boxes, check boxes, and radio buttons, for example. Each block has properties such as name, type, and value. The following provides an example of the structure of an HTML document:

<HTML>
  <HEAD>
    . . . element(s) valid in the document head
  </HEAD>
  <BODY>
    . . . element(s) valid in the document body
  </BODY>
</HTML>

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of an another character, "/" that follows the "<" character.

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other HTML elements are described in HTML reference manuals.

Advertising

In traditional media (e.g., television, radio, and newspaper), local advertising is provided by radio stations, television stations, the different newspaper editions, and different newspaper distributors. The local advertisers target a sub-group, often defined geographically, of the audience for that media outlet. For example, a local newspaper distributor for a metropolitan city newspaper (e.g., the Houston Chronicle or Los Angeles Times) may include advertising inserts and coupons from local grocers and shopkeepers with the newspaper.

Online advertising on the internet has followed the advertising approach in traditional media. Advertising space on the internet is sold by web hosts to third parties (advertisers). Additionally, an advertising agency may be hired by the advertiser to conduct internet advertising.

Advertising space on the internet often appears as a banner or icon on a web page. Banners often range from ½–4 inches high and 4–8½ inches wide. The banner or icon may be an image, text, or an image with text. Additionally, the banner or icon may have a hyperlink to the advertiser's web page. Thus, if a user clicks on an advertiser's banner, the user's browser will load the advertiser's web page.

Payment schemes for online advertising vary. For example, an advertiser may pay based on the number of times different users access a web site (referred to as hits or page impressions). Alternatively, an advertiser may only pay if a user clicks on the advertiser's banner or icon and views the advertiser's web page (referred to as a click-through). Further, a web host may also receive payment based on any completed transactions that result from a click through (e.g., the web host receives a percentage of the payment received by the advertiser from the user) (referred to as referral commissions).

Advertising schemes attempt to target audiences that would most likely be interested in the product or service being advertised. For example, the commercials aired in connection with cartoons on television often relate to children's toys, cereal, or other items that children would utilize. Consequently, the more information known about a viewer or user of a particular web site, the more targeted an advertisement may be.

In existing internet advertising schemes, a web host often provides one advertisement that all clients or users view. Consequently, there is one global advertisement that all users of the web site see. Such a global advertisement assumes a homogeneous interest by all users and does not provide different advertisements based on different interests or characteristics of users.

Prior Art Advertising Schemes

One internet advertising scheme attempts to target specific audiences based on demographics. For example, a web site that provides information about a specific city (e.g., San Francisco) may attempt to capture local audiences by placing advertisements for businesses located in or near San Francisco. Thus, advertising on a Yahoo-San Francisco bay web site would attempt to target a local San Francisco bay area audience.

Another advertising scheme bases the advertisement on input from the user. For example, if a search for baby books were made on a search engine such as Yahoo, the web host for Yahoo may display advertisements relating to baby merchandise such as strollers and high chairs.

Another advertising scheme accesses cookies stored on individual's browsers to determine the types of web sites that have been accessed. Cookies are small pieces of information that can later be read back from a browser. When a web site is accessed, a cookie is sent by the web site identifying itself to the web browser. Cookies are stored by the browser and may be read back by any server that desires to access the cookies at a later date. Based on the information retrieved from the cookies, a local advertisement targeted to the specific user's interests (based on the web sites that user has accessed or retrieved a cookie from) is provided. Alternatively, the advertising scheme may evaluate the HTTP referring page information. To prevent this information from being distributed or used in any manner, software is available that enables users to strip off cookies or HTTP referring page information. Further, the information collected only pertains to the small set of sites which the advertiser has a business relationship, either directly or indirectly through an advertisement network.

Another advertising scheme attempts to guess the geographic location of a user based on the client's internet protocol (IP) address. When accessing the internet, individual clients are differentiated from each other by a unique number referred to as an IP address. In this advertising scheme, a database is maintained by the web host that contains a mapping that provides a correspondence between each IP address to a modem phone number. The mappings are created by retrieving the modem phone numbers and the different IP addresses that the modem phone numbers correspond to from internet service providers (ISP) (ISPs are companies that provide internet access to users). By searching the database for the IP address, the web host or advertising company can deduce which modem phone number the user called in from. Based on the modem phone number and area code, the web host or advertising company can deduce where geographically the user is from or what telephone exchange the user is closest to. Consequently, the user is provided advertisements based on the estimated geographic location of the user.

Each of the above advertising schemes relies on the insertion and transmission of the advertisement by the web host. Additionally, each advertising scheme relies on information retrieved from the user (which may be modified by the user) or attempts to guess information about the user. Consequently, advertising is not precisely targeted and the premiums paid for "good demographics" and "precise targeting" are lower.

The above advertising schemes also create additional processing overhead for the web host (for implementing an advertising scheme), require extra bandwidth to transmit the advertisement across the network to the user, and poorly target specific audiences. Further, due to the increased overhead and low hit count for small web sites, advertisers are reluctant to advertise on the smaller web sites. Additionally, due to the high advertising costs for large and frequently used web sites, small businesses cannot afford to conduct advertising.

Advertising payment schemes do not provide for payment to the ISPs. Since ISPs do not benefit from the advertising, ISPs often do not cache the advertisements (resulting in increased transmission time) and software to strip off advertisements from web pages have appeared. Further, since payment schemes may be based on the number of hits, the hit count and number of page impressions must be determined. Techniques for checking and auditing the hit counts and number of page impressions are primitive and primarily based on trusting the web host who may inflate the numbers.

SUMMARY OF THE INVENTION

A method and apparatus for local advertising on the internet. Advertising is increasingly utilized by owners of web sites (referred to as web hosts) as a revenue source and for the advertisers to gain publicity and web site access. Web hosts sell advertising space on their web site and distribute web pages including the advertisements to internet users or clients. It is desirable for advertisements to target specific audiences and persons that may be interested in the specific good or service being advertised. Prior art advertising schemes poorly target audiences and create excessive internet traffic when retrieving and transmitting advertisements.

According to one ore more embodiments of the invention, Internet Service Providers (ISPs) or proxies owned by an ISP insert advertisements that are transmitted from a web host to a client. Additionally, any entity may insert or replace an advertisement that is transmitted to a client. The inserted advertisement may be an advertisement that is stored in the proxy's cache or may be retrieved from a web server for an advertiser. By providing the ISP with the ability to insert the advertisement, advertisements appear on small web sites that do not normally attract advertisers. Additionally, due to the number of advertisements placed by an ISP, small advertisers may have their advertisement appear in connection with frequently used web sites.

In addition to inserting advertisements, one or more embodiments of the invention provide for an ISP to collect and store information regarding particular users in a user profile. The information may include demographic information such as the user's age, residence, credit history, etc. Additionally, the information may include the web sites that the user has accessed, the time spent on each web site, and any internet searches performed by the user.

The profile information may be utilized by the proxy to conduct targeted advertising or the information may be provided to a web host so that the web host may conduct targeted advertising. The profile information may also be utilized to associate a cost with certain demographic information. For example, if the profile information indicates that the user is interested in automobiles, a premium may be charged to an automobile advertiser. The profile information may be evaluated by the ISP for advertisement insertion. Alternatively, the profile information may be forwarded to an advertiser or advertising agency that evaluates and forwards back an advertisement for the proxy to transmit to the user. Thus, the profile and demographic information is utilized to precisely target advertisements to specific users.

DETAILED DESCRIPTION OF THE INVENTION

The invention is a method and apparatus for local advertising on the internet. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
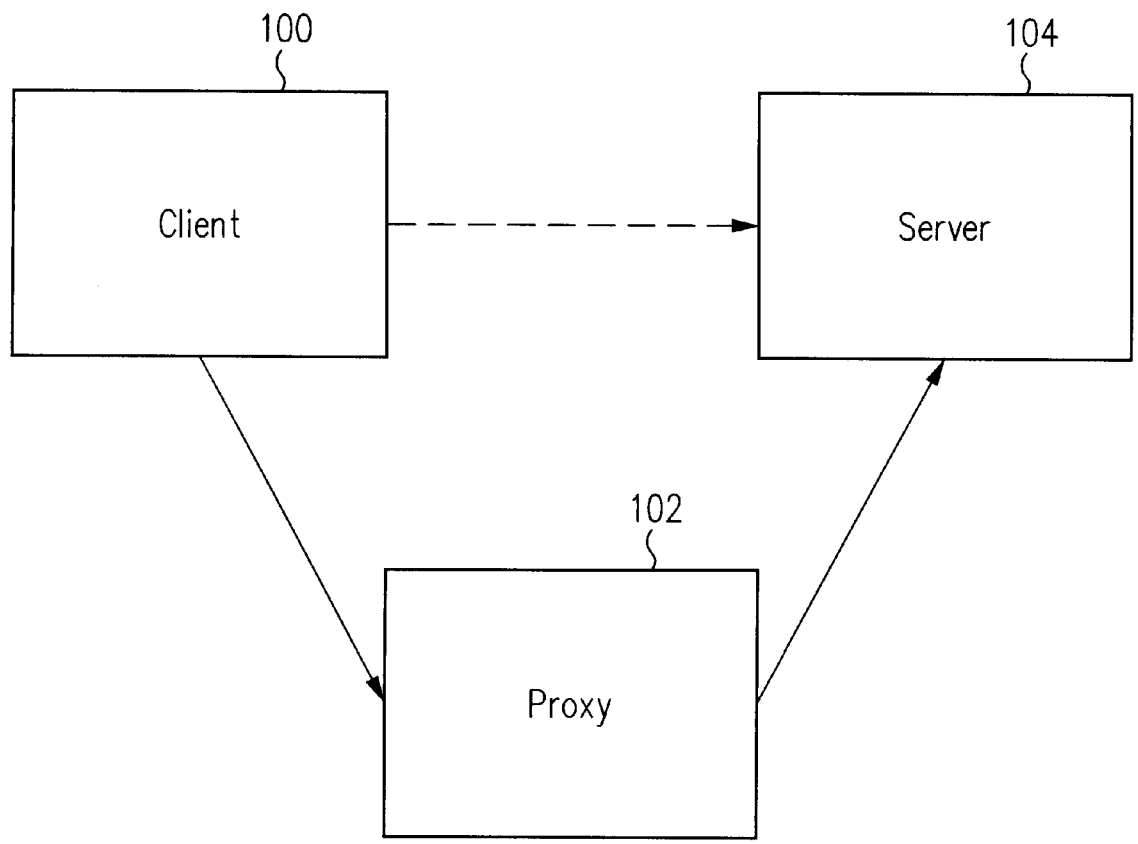
FIG. 1 illustrates a prior art method for processing web pages.
Figure 2:
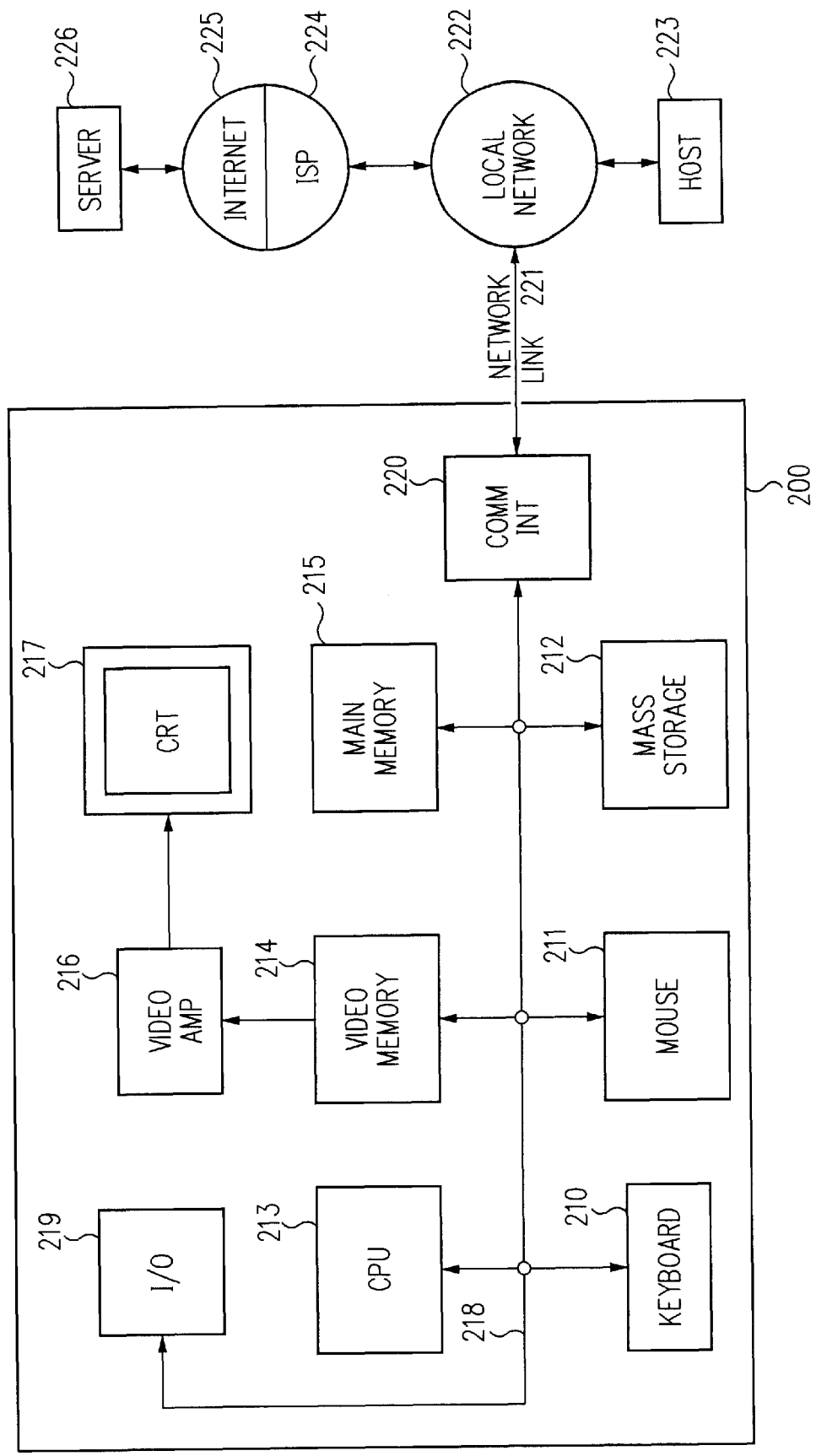
FIG. 2 is a block diagram of one embodiment of a computer system capable of providing a suitable execution environment for one or more embodiments of the invention.

An embodiment of the invention can be implemented as computer software in the form of computer readable code executed on a general purpose computer such as computer 200 illustrated in FIG. 2, or in the form of bytecode class files running on such a computer. A keyboard 210 and mouse 211 are coupled to a bi-directional system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to local server computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, remote server computer 226 might transmit a requested code for an application program through Internet 225, ISP 224, local network 222 and communication interface 220.

The received code may be executed by processor 213 as it is received, and/or stored in mass storage 212, or other non-volatile storage for later execution. In this manner, computer 200 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Embodiment of Software Apparatus for Local Advertising on the Internet

One or more embodiments of the invention provide for local advertising on the internet. Advertisements and web pages are transmitted to a user from an ISP or intermediate proxy. The advertisements may be inserted (or existing advertisements may be replaced) by the ISP, by the web host, or by a third party. When advertisement insertion is performed by the web host, the specific advertisement inserted is based on user information such as demographic information or the user's preferences. Such user information is obtained by the ISP or intermediate proxy. Accordingly, one or more embodiments enable local advertising through information maintained by an ISP or local advertisement insertion by an ISP or intermediate proxy.

Internet Service Providers (ISP)

For most users to access the internet, an ISP is utilized. To utilize an ISP, an off-line relationship between the user and the ISP is established wherein the user sets up an account with the ISP by supplying the user's name, address, and other relevant information (e.g., credit card number for payment, credit rating, etc.). In exchange, the ISP assigns a user name, password, and potentially a static IP address (or a dynamic IP address if dial in access is utilized) to the user. Additionally, the ISP may obtain information for other off-line sources.

Proxies (as described above) are usually owned and provided by a user's ISP. To access the internet, the user establishes a connection with the ISP or proxy. The user or client then requests a URL from a web server. The proxy intercepts the request, searches its cache for the requested information and returns the information to the client if the information is in the proxy's cache. If not in cache, the proxy communicates with the web server, retrieves the information, and forwards the information to the client.

Since the ISP or proxy is utilized to conduct all internet access, when a user views a web page or completes any transactions on the internet, each and every user action is processed through the ISP or a proxy of the ISP. Consequently, the ISP has the ability to maintain statistics on the user and the user's internet viewing (referred to as user information or profile information) transparently to the user (without the user's knowledge). More specifically, the ISP has the ability maintain a user's profile consisting of demographic information such as the user's age, credit history, earnings, interests, purchases, the sites (URLs) the user has accessed, the amount of time spent on each and every web site (URL), other user accesses (such as emails, news readings/postings, etc.), and information when the user posts data or conducts searches (e.g., from queries/messages from a web server). Additionally, due to the off-line business relationship between the user and the ISP, privacy concerns may be addressed (compared to the lack of a business relationship with strangers). The collection and processing of user/client information is more fully described in co-pending U.S. patent application Ser. No. 09/192,806, entitled "Method and Apparatus for Processing Client Information" filed on Nov. 16, 1998.

Profile Collection

Figure 3:
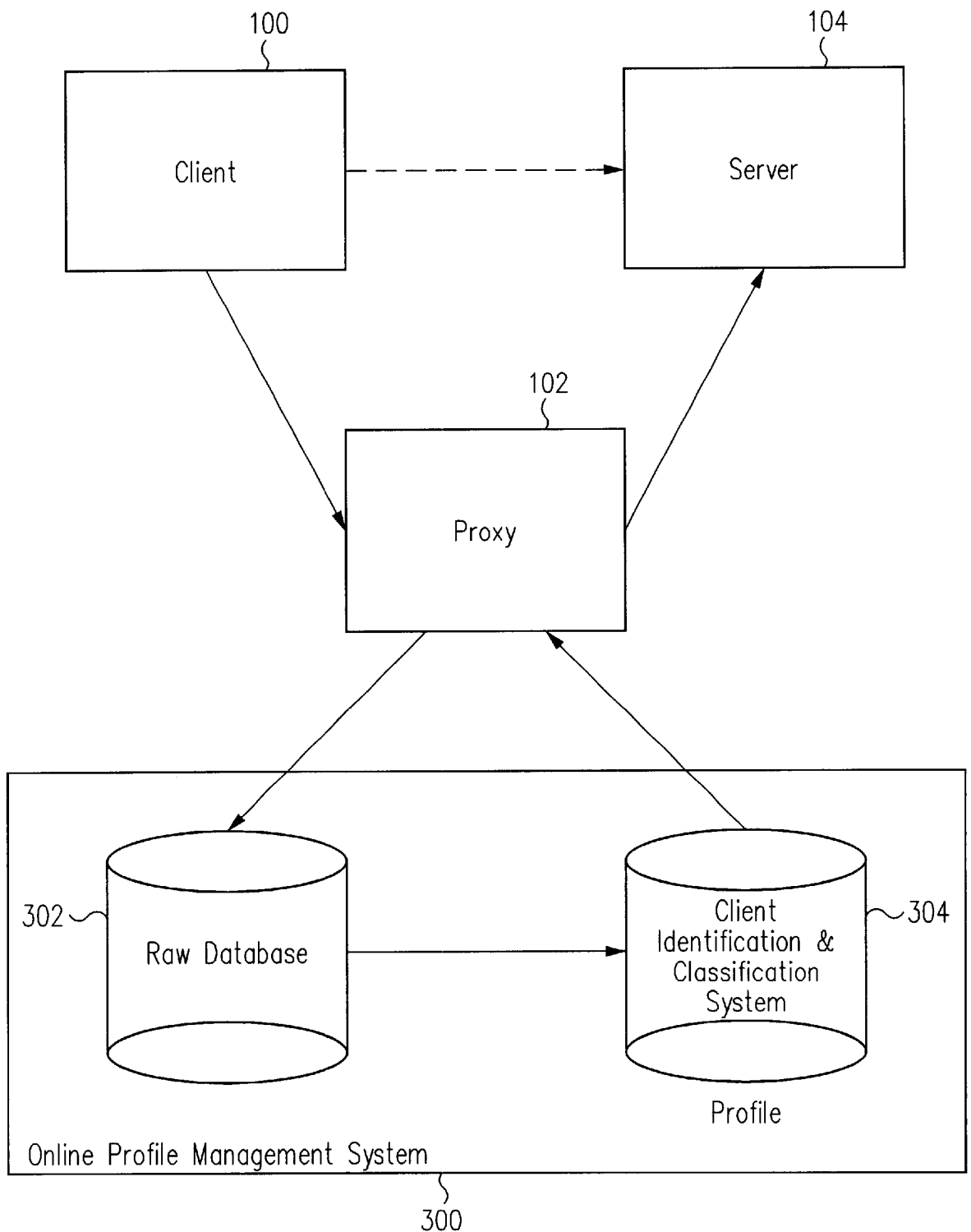
FIG. 3 illustrates the relationship of an Online Profile Management System with a client, server, and proxy according to one or more embodiments of the invention.

Profile information may be collected and maintained by a proxy in an Online Profile Management System. FIG. 3 demonstrates the relationship of an Online Profile Management System 300 with a client 100, server 104, and proxy 102. As described above, all URL requests, text, and other information is transmitted from client 100 to proxy 102. Proxy 102 copies this information and stores it locally in a raw database 302. Thus, each time client 100 initiates a request for a URL, information regarding the request is stored in raw database 302. Additionally, when a user executes a search on an internet search engine, the text of the search may be stored in raw database 302. One unique element that only the proxy or ISP has access to, is the time that a user spends on a particular web site. Such time spent information may also be stored in raw database 302. Additionally, the proxy may use the time spent information and other information to filter out search engine robots that repetitively access links of a web page to add to the search engine's database.

A profile 304 for each client is maintained in a Client Identification & Classification System. Profile 304 contains all information regarding a particular client or user including information collected off-line such as the user's name, residence, phone number, occupation, alternate email address, etc. The information from the raw database 302 is transferred and organized in the profile 304. Profile 304 may then be merged with other information databases such as mailing lists, direct marketing lists and subscriptions, a user's credit history, and shopping club information (e.g., if the user is a member of a market's shopping club, the information from the shopping club's database may be merged through an agreement between Proxy 102 and the market). The profile may also be time sensitive and created in real time so that when a user executes a search on an internet search engine, the search text is stored in the profile immediately. Additionally, if the user is at a non-payment based public terminal (e.g., at a library), the profile may be limited to the user's recent history and information about the terminal and terminal location may be utilized. Further, if the user is at a payment-based public terminal, the client's address, credit card information, and recent history as the user browses the internet may be utilized.

A profile is useful in determining the type of advertisement to display to a user. For example, if the profile indicates that client 100 executed a search for "flowers", the advertiser may desire to transmit a local flower shop advertisement to client 100. A profile may also be utilized to specifically target clients that utilize a competitor's goods or services. For example, if the profile maintains knowledge that the client accesses a Pizza Hut web site, the ISP can include advertisements for Round Table Pizza or Dominos Pizza on the user's next web access, even if this access is to a totally unrelated site. Further, if the profile indicates that the client has inquired about Burger King Jack in the Box, fast food, hamburgers, etc., the ISP can include advertisements for McDonalds or another competitor.

Advertisement Insertion

One or more embodiments of the invention provide for several schemes for placing or inserting an advertisement into a web page. Three of these schemes are demonstrated in FIGS. 4a–4c.

Figure 4A:
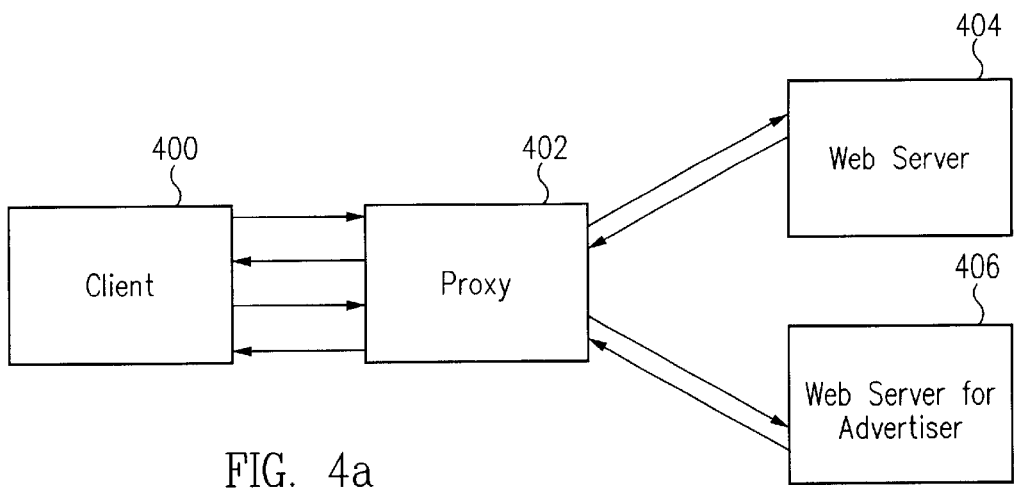
FIG. 4 demonstrates several schemes for placing or inserting an advertisement into a web page according to one or more embodiments of the invention.
Figure 4B:
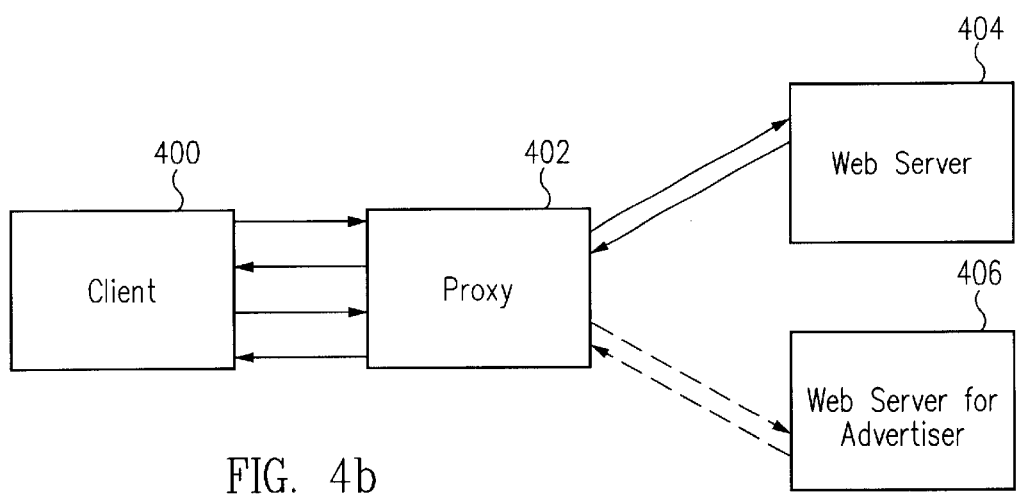
Figure 4C:
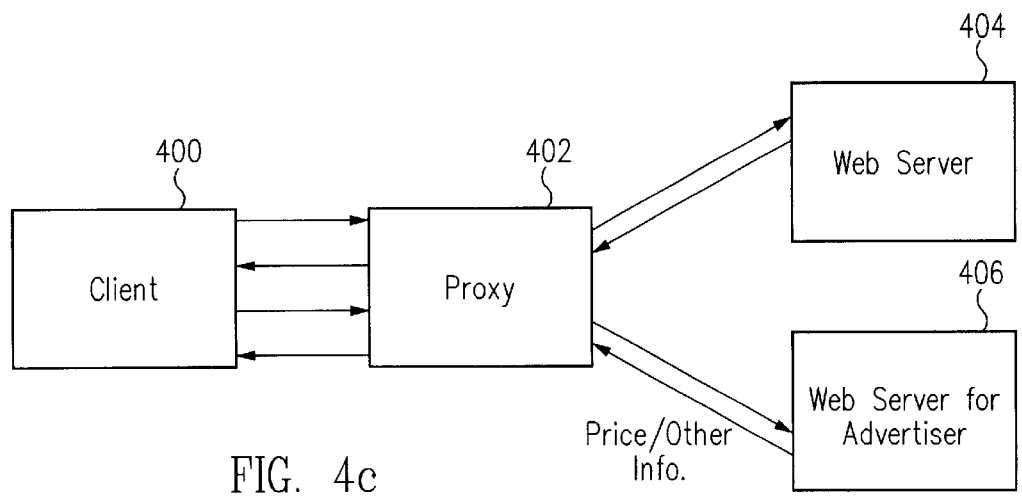

In FIGS. 4a–4c, client 400 requests a URL from web server 404 which is intercepted by proxy 402. Proxy 402 requests the URL from web server 404 if the information is not in the cache of proxy 402.

Referring to FIG. 4a, if the advertisements are not included in the information provided by web server 404 to proxy 402, the information provided by web server 404 may include additional URL information specifying the advertisements for proxy 402 to fetch from the web server for the advertiser 406. Consequently, proxy 402 retrieves the necessary advertisement from the advertiser's web server 406. Subsequently, proxy 402 forwards the information including the advertisements to client 400.

Alternatively, an advertiser (or web server for an advertiser) 406 may specify the type of customer/client 400 it is interested in and the amount of money it is willing to pay for such information. For example, advertiser 406 may state that it is interested in client 400's age and credit rating. Specifically, advertiser 406 may be interested in clients that are (a) in the 18–35 age group (e.g., code=a1835); (b) live in or around Palo Alto, Calif. (e.g., code=c35), and (c) have previously ordered food on-line (e.g., code=of) and is willing to pay 10 cents for every such client 400. When proxy 402 transmits the web request to web server 404, advertiser 406's preferences may be forwarded to web server 404. For example, proxy 402 may add the following to the URL request: "&proxy:code=a1835+c35+of:age=23+val2=AB" (or places the same information in appropriately defined HTTP options). When server 404 receives the URL request with the added information, server 404 may then use the added information to insert appropriate advertisements that it has stored, to verify the customer demographics information, to provide tailored content for the demographics, or for some other purpose. Thus, the ISP may receive payment based on the demographic information they provide.

Referring to the scheme demonstrated in FIG. 4b, client 400 requests a URL from web server 404 that is intercepted by proxy 402. Proxy 402 retrieves the relevant information excluding the advertisements from web server 404. In one or more embodiments, proxy 402 inserts advertisements and forwards the completed package to client 400. In such an embodiment, multiple advertisements may be stored by proxy 402 in a database or the cache of proxy 402. These stored advertisements may be retrieved (from web server 406, for example) prior to the URL request from client 400 or may be retrieved when the client URL request is received by proxy 402. Further, the advertisements may be purchased from another ISP if desired. By storing advertisements prior to receiving a URL request, a response may be provided more quickly to client 400 (the step of retrieving an advertisement from web server 406 is eliminated) resulting in effective caching.

Alternatively, client 400 may be provided a web page with an empty slot due to an IMG directive (a directive (as specified in the HTML of the web page) to load an inline image stored on the server). An advertisement slot is the location and space in the web page where the advertisement will be or is placed. An advertisement slot may already contain an advertisement (referred to as an advertisement block) that may be replaced or may be an empty slot. When an empty slot is transmitted, client 400 attempts to retrieve information for the empty slot. The retrieval may be intercepted by proxy 402 who may then insert an advertisement.

Referring to FIG. 4c, client 400 transmits a URL request to proxy 402 which then retrieves the URL request excluding the advertisement block from web server 404. To insert an advertisement, proxy 402 transmits the advertisement slot characteristics and advertisement characteristics (as provided by web server 404), profile, cost, or other information (stored as described above) to the advertiser's web server 406. For example, proxy 402 may inform web server 406 that the user that is requesting the URL has accessed numerous automobile sites or is shopping for an automobile. Alternatively, proxy 402 may inform web server 406 that the cost for the advertisement is 10 cents. Web server 406 determines the advertisement block to insert and informs proxy 402 (if proxy 402 has been provided multiple advertisements in advance for cache storage) or forwards the advertisement to proxy 402. Further, in one or more embodiments, multiple advertisements may fit within the advertisement slot provided In addition or in combination with the options illustrated in FIGS. 4a, 4b, and 4c, proxy 400 may initiate the local advertising by expressing interest in inserting its own advertisement (that may or may not be stored in the proxy's cache) or inserting multiple advertisements to web server 404. For example, proxy 402 may indicate an interest in placing an advertisement to web server 404. In response, web server 404 returns an advertisement slot with a price to proxy 402 (in addition to the requested web page). In another embodiment, proxy 402 could indicate an interest in inserting an advertisement along with a price it is willing to pay. Negotiations for the price may then continue as described in detail below. The advertisement pricing may be based on a number of factors including the number of advertisement that the proxy has or can display, the number of negotiable advertisement spots, the current market history, and the history of previous price agreements with a particular party. One or more embodiments of the invention set the price equal to the most expensive advertisement price for the demographic. The price may then be adjusted by the opportunity cost that the advertisement cannot be shown (or shown as often) or by other factors such as the past history, for example.

After obtaining the profile information and a set of potential advertisements that may be inserted, the proxy must determine which particular advertisement to insert for this particular user. In one or more embodiments, a database that maps users to their profiles/preferences is utilized to access the profile information. In one or more embodiments, a database contains a mapping of profiles or preferences to a set of advertisements. In one or more embodiments, a database of advertisements with their prices is maintained.

Once desired databases are established, a policy for selecting the advertisement to insert may be utilized. For example, the proxy may implement a policy that displays the most expensive advertisements for a particular slot. In one or more embodiments, advertisements may be rotated for the same user so that the same user is not always displayed the same advertisement. In one or more embodiments, the advertisement may be selected based on the number of advertisements placed by an advertiser. For example, if Toyota has authorized 100 advertisement inserts and Nissan has authorized 100,000 advertisement inserts, the Nissan advertisements may be utilized more frequently to save the Toyota advertisements for when the Nissan advertisements cannot be used (based on the user's profile or other characteristic (e.g., limited browser capability)).

In order to insert an advertisement, the size and characteristics of the advertisement and the advertisement slot must be known by proxy 402. Proxy 402 is able to determine the characteristics of the advertisement slot (e.g., dimensions of the advertisement slot) based on the information transmitted from web server 404. In one or more embodiments, the characteristics of the advertisement and advertisement slot are encoded as part of the URL itself or around the URL (but not encoded as part of the URL). In another embodiment, the characteristics of the advertisement and advertisement slot are specified in tags of the HTML. In another embodiment, the characteristics of the advertisement and the advertisement slot may be shipped as part of the HTTP headers (as described above). The specifics of such tags are discussed in detail below. Alternatively, the type of advertisement to be inserted may be specified by web server 404, the type of advertisement that cannot be inserted may be specified by web server 404, or the type of advertisement to be inserted may be left up to proxy 402.

In one or more embodiments, the price information for the advertisement slot may consist of multiple values with each price dependent on the advertisement size and slot location (e.g., high on the web page v. the end of the page). Additionally, the price may vary depending on the number of advertisement slots that the proxy or web server purchases (e.g., a discount for volume advertisement placement) and on the number of other third party advertisements that may be present on the page.

Figure 5:
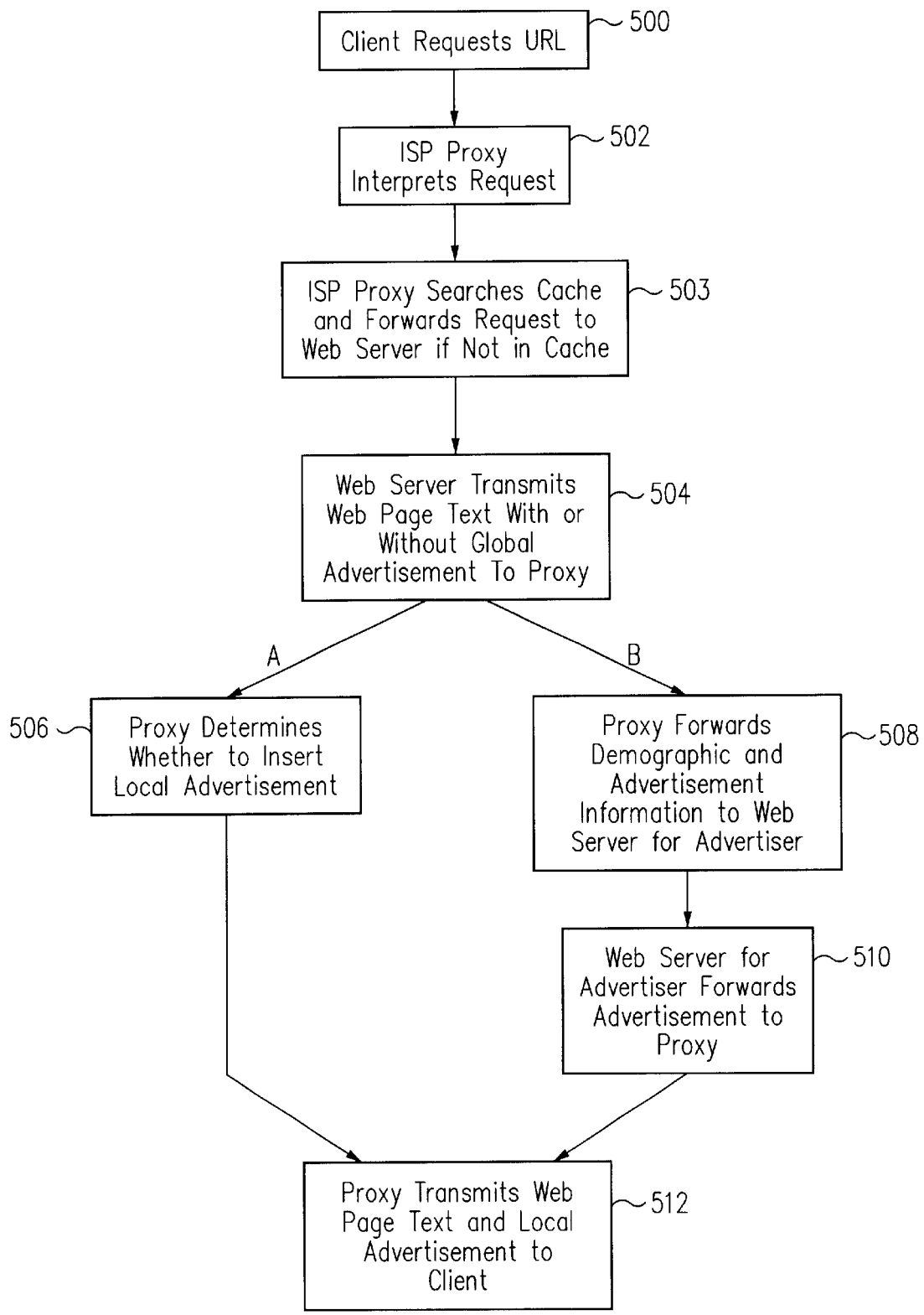
FIG. 5 illustrates advertisement insertion according to one or more embodiments of the invention.

FIG. 5 illustrates advertisement insertion according to one or more embodiments of the invention in connection with FIGS. 4a–4c. At step 500, client 400 requests a URL from web server 404. At step 502, ISP proxy 402 intercepts the URL request. At step 503, proxy 402 searches its cache for the specified web page. If the specified web page is not in cache, proxy 402 forwards the web page request to web server 404. At step 504, web server 404 transmits the specified web page to proxy 402. The transmission by web server 404 may include a determination regarding whether to insert a global advertisement or to transmit a blank advertisement slot for an advertisement insert by proxy 402. If a global advertisement is inserted, web server 404 may specify that the global advertisement cannot be stripped, removed, or replaced with a local advertisement by proxy 402. Further, the transmission of a blank slot may also include a specified price or restriction requirement for the advertisement insertion. Thus, the web page transmitted may include a global advertisement inserted by the web host (in such a situation, web server 404 may determine that it is more cost effective to insert a global advertisement than to rely on an advertisement insertion by proxy 402). Alternatively, the transmission by web server 404 may exclude a global advertisement or provide a replaceable advertisement block due to the lack of an advertising contract (with an advertiser), as a result of a previously agreed upon blank slot for the proxy to insert an advertisement, or as the result of a contract dynamically negotiated in real time between proxy 402 and web server 404.

The dynamic negotiation between proxy 402 and web server 404 may be completed in a single message-exchange wherein the initiator names his/her price and the other party agrees/disagrees. For example, in one form of negotiation, ISP 402 may initiate the negotiation by offering web server 404 a certain sum of money if web server 404 returns a web page with an empty advertisement slot (this may be passed by ISP 402 to web server 404 in the initial HTTP request). In exchange, web server 404 either returns a page with an empty slot to accept the contract, or does not include any empty slots to decline the contract. In another form of negotiation, web server 404 initiates the negotiations by returning a page with an empty advertisement slot or a replaceable advertisement block and offering the ISP 402 the option of introducing a local advertisement at a certain price (the URL where proxy 402 must go to fetch the real advertisement if it does not want to insert a local advertisement at the listed price may also be provided by web server 404). In exchange, if ISP 402 does not accept the offer, ISP 402 may fetch the web site's advertising (the advertisement block) from web server 404 (or web server 406 if the URL is provided to ISP 402). Alternatively, ISP 402 may specify the amount ISP 402 is willing to pay to web server 404 for use of the advertisement slot (in which case, web server 404 then responds to ISP 402 by accepting, declining, or providing an alternative amount). Additional iterations may then ensue until an amount for the advertisement is agreed upon, or the negotiation is terminated by one party (e.g., by sending a page without an empty advertising slot, or by removing the offer).

Referring again to FIG. 4, two of the options that may be implemented by one or more embodiments of the invention to complete the advertisement insertion process are described. Under Option A, proxy 402 determines whether to insert a local advertisement at step 506. This determination may include replacing the advertisement block (unless such replacement is restricted by web server 404) forwarded from the web server 404. Further, the determination may be based on the demographic profile information stored by proxy 402. As described above, the specific advertisement or type of advertisement to be inserted or any advertisement restrictions may be specified by web server 404. Additionally, under Option A, upon receipt of a web page without advertisements, proxy 402 may negotiate (in real time) with web server 404 for the insertion of an advertisement. Such a negotiation may include proxy 402 specifying the amount it is willing to pay web server 404 for an advertisement insertion. Subsequently, proxy 402 may insert an advertisement that proxy 402 has stored in cache or may request the transmission of an advertisement block from the web server for the advertiser 406. However, if an advertisement is to be inserted from cache, proxy 402 must determine whether such cached advertisement is valid. For example, proxy 402 may not be able to insert a cached advertisement based on a preexisting agreement that only allows advertisements to be inserted on a per request basis or the time limit for a particular advertisement may have expired. Whether a cached advertisement is valid may be specified in the tag fields discussed in detail below. At step 512, proxy 402 transmits the web page text and any associated advertisement to client 400.

Under Option B, at step 508, proxy 402 forwards demographic information, costs, and other information to the web server for the advertiser 406. At step 510, the web server for the advertiser 406 determines the advertisement to insert. As described above, the determination may include an evaluation of the demographic material by web server 406 so that a targeted advertisement may be inserted. Web server 406 may also evaluate the associated costs for the advertisement. At step 510, web server 406 forwards the selected advertisement, if any, to proxy 402. At step 512, proxy 402 inserts the advertisement and forwards the web page text and local advertisement to client 400.

Alternatively, a URL transmission may pass through multiple proxies (e.g., four or five). In such a situation, is response to a URL request, web server 404 may reply (as described above) with an empty advertisement slot, and require a five cent payment if the slot is utilized (a URL from which the advertisement should be fetched if not inserted by proxy 402 may also be provided). The proxies on the path from server 404 to client 400 may elect to (a) pass the request to the next proxy, (b) perform a local insertion (accepting the specified price), or (c) increasing the price of the insertion and changing the URL that the advertisement is to be fetched from (if further proxies elect not to perform a local insertion). Thus, advertisements and advertisement slots may be sold by one proxy to another proxy or one entity to another entity.

For example, the first proxy (on the path from server 404 to client 400) may determine that the slot is worth six cents and raise the price of the advertisement insertion (the first proxy may also replace the alternative advertisement URL). The second proxy may elect not to perform a local advertisement insertion because the price is too high. The third proxy may elect to increase the price to eight cents and again replaces the alternative advertisement URL. Remaining proxies may then decline local advertisement insertion. In such a situation, the local advertisement will be retrieved from the URL specified by the third proxy. Thus, the third proxy provides six cents to the first proxy, who pockets one cent (six cents minus five cents) and the first proxy pays the web site five cents.

By evaluating demographic and profile information as described, direct marketing advertisers and one-on-one advertisers may more accurately target specific individuals. Further, the ISP 402 (and other proxies) benefits (by selling advertising space and utilizing its collected profile and other information), web server 404 benefits (by selling more advertising space regardless of whether web server 404 is small or large), advertiser 406 benefits by accurate targeting (resulting in an increased probability of a click-through), and client 400 benefits by receiving advertisements that the client may be particularly interested in. Additionally, if client 400 does not want its information released or collected, client 400 may enter into a contract with ISP 402 restricting the use, distribution, or collection of such information or utilize an ISP 402 that does not maintain demographic databases or user profiles.

The above embodiments may or may not utilize the information stored in the proxy's cache. For example, the proxy may negotiate a price for a certain number of page uses or advertisement inserts. Thus, the proxy's cache can be utilized for the specific number of advertisements negotiated. Alternatively, an advertisement may be identified to be displayed to one end user. If another user requests the same page, the proxy can issue a conditional "get" request from the server. The server can then respond with a new price structure for the advertisement or with updated values for the various parameters. Using this approach, user-specific pricing is available without downloading the same advertisement or web page content repetitively. In one or more alternative embodiments, the proxy and server utilize a common user identification system to set advertisement selection and prices. For example, the server could identify a set of cookies or profile details for which it is willing to pay a specific price (e.g., 5 cents per display for a medium size slot). As a result, whenever the proxy intercepts a request from a user that matches the cookie or profile details, the proxy can elect whether or not to insert the advertisement for the server's set price.

Advertisement Tags

To specify advertisement characteristics, advertisement tag(s) may be specified in the HTML. The server could specify a tag or tag combination (e.g., a <A> . . . </A> block that follows one of the tags described below. Alternatively, the proxy could make an educated guess regarding the statistics using a new tag or based on a <A> . . . <IMG . . .> </A> tag combination (along with a database of substrings to match) for example. Different characteristics may be specified as part of one tag or multiple tags. An ADSIZE tag may specify one or more of the standard defined sizes (e.g., half size or full size) for banner advertisements or the dimensions of the "slot" for the advertising banner.

An ADPOSITION/ADLOCATION tag may specify the location for a particular advertisement on a web page (e.g., position 8 or 3 inches from top and 1 inch from left side of web page) and may be used in conjunction with an ADSIZE tag.

An ADPRICE tag may specify the cost for placing the advertisement. The cost may be based on the size of the banner (e.g., half 5.2 full 3.4) or may be based on a prior relationship between the advertising agency and the proxy (e.g., based on a click through, referral commission, or the demographic information supplied by the proxy). Additionally, the ADPRICE tag may specify a particular currency, specify multiple alternative pricing schemes, or specify an additional cost if the advertiser desires to maintain exclusivity for the web site (e.g., if the advertiser desires only advertisements for a specific car brand (e.g., Toyota) to appear on a web site, a premium or additional cost may be assessed). Alternatively, the ADPRICE tag may be utilized by an advertiser to notify the proxy what it is willing to pay for a specific advertisement.

An ADRESTRICT tag may specify the categories/types of advertisements to allow/deny. For example, a religious web site may desire to exclude any advertisements for pornographic web sites or to only allow advertisements for books.

An ADDEMOGRAPHIC tag may specify demographic information about the user that the advertisement will be presented to. Such a tag may be utilized in connection with one or more embodiments described in connection with FIG. 4c above. For example, the age, credit history, salary, interests, prior purchases, prior web sites accessed, web search conducted, shopping information, or time spent on a particular web site (which is only known by the ISP or proxy) may be specified. Alternatively, the ADDEMOGRAPHIC tag may be used in conjunction with the ADPRICE tag by the advertiser to inform the proxy what the advertiser is willing to pay for a specific advertisement displayed to a particular user with specified demographic information. For example, the advertiser may specify that he/she will pay 10 cents for a mortgage advertisement displayed to a first time home buyer and 5 cents for a mortgage advertisement displayed to an existing home owner.

In addition to the above tags or in conjunction with the above tags, an additional LOCALAD_NEGOTIATION tag or bits may be used to identify the negotiation process. For example, one part of the LOCALAD_NEGOTIATION tag may specify that web server 404 is open to negotiations to determine the cost for a local advertisement insertion. Another part of the LOCALAD_NEGOTIATION tag may specify the maximum negotiation that is permissible (to limit the web page transmission time to a waiting client 400). For example, the maximum negotiation may be a unit of time such as 10 seconds or a number of transmissions that occur between proxy 402 and web server 404, e.g., 4 transmissions.

An IMG directive may also be utilized to specify information about the image to be displayed (that may contain the advertisement) along with the advertisement slot characteristics. For example, the tag <IMG SRC=ad-image.gif WIDTH=40 HEIGHT=60 PRICE=34> provides for an image named ad-image.gif with a width of 40, a height of 60 and an added advertisement price field with a value of 34.

Alternatively, instead of specifying the above information in the form of an HTML tag, the information may be specified as part of the URL request that is provided to the advertiser or as part of the data stream. For example, the server may specify that the advertisement slot in the HTML is transmitted as characters or bytes 55 to 75 of the data stream.

Auditing and Cross Verification System

Once advertisements have been displayed to a user, the advertiser will pay the agreed upon amount to the advertising agency, proxy, or web host. Since hit count numbers and click-through numbers may be inflated, a system for auditing and verifying that an advertisement was actually displayed to a user is desirable. Additionally, in a situation where the ISP maintains a contract directly with the advertiser (i.e., the ISP pays the web host (with money received from the advertiser) for advertisement space), the web host may desire to verify the amount paid by the advertiser to the ISP. Such verification may be performed by a third party such as an independent auditor.

Referring to FIGS. 4a–4c, logs containing information regarding all transmissions are maintained by proxy 402, web server 404, and web server 406. Such logs may have to be maintained at the request of the advertiser. For example, the logs may maintain a unique connection identifier such as the time, the advertisement inserted (if any), and the 4-tuple (src IP address (source IP address), src port (port number of the source), dest IP address (destination IP address), dest port (port number of the destination). Consequently, web server 404 maintains information regarding the number, type, and timing of URL requests that it receives and transmits to proxy 402. Similarly, proxy 402 maintains information regarding the number, type, and timing of advertisements it transmits to client 400.

Client 400 may be uniquely identified from other clients at any one point in time using various methods. For example, the IP address or port number may be a unique number assigned to client 400. However, since multiple family members may use the same computer with the same IP address or port number, a user's login name, or the user's login name concatenated with the IP address or port number may be utilized to unique identify a client 400 from other clients and to differentiate between family members (the assigned IP address may also be mapped to a unique user identifier). The user can also be identified by the cookies that the user transmits to web sites. Alternatively, a group of users may be identifiable. For example, the ISP may assign a block of users to use the same proxy which may then be utilized to identify the aggregate of users. Consequently, based on the information, the advertiser may restrict the proxy to only insert advertisements on pages from chosen web sites, if desired.

To verify the number of advertisements actually displayed to client 400, the URL request from a particular client 400 at a particular time (and the resulting transmission) stored in the log of web server 404 may be cross-checked with the transmission of the advertisement (and the web page from web server 404) to a particular client at a particular time stored in the log of proxy 402. By cross checking and comparing the information from the log of web server 404 and from the log of proxy 402, the advertiser may determine whether an advertisement was actually displayed and the web host 404 may calculate the amount of money it expects to receive. The advertiser may also limit the cross checking to the larger web sites to attempt to determine how many transmissions occur with a particular ISP (to determine if the number of paid advertisements matches the number of transmissions). Additionally, the advertiser may confirm and cross check the amount of money that the web server receives from advertising.

Additionally, the advertiser can obtain the hit-count information from different sets of content-providers (web servers) as well as different sets of proxies (with each hit equaling a content-provider providing a page to one proxy that substitutes the advertisement). Cross-referencing may then be performed to check whether each proxy is behaving within the industry norm for all proxies for that particular advertisement being served (from that particular server or in general from all servers). This industry norm can be more accurately determined using a sampling auditing scheme. In a sampling scheme, the proxy may be informed that no advertisements are available or that the pages are non-cacheable (for a subset of page views). The advertisement hit-rate (and repeat rate) is then obtained. The proxy's claims regarding the hit-rate and repeat-rate are then statistically examined to determine if the rates are likely or not.

The cross-checking as indicated above may also be placed into a spreadsheet or database that maintains the information regarding the number of mismatches. Based on the number or percentage of mismatches, additional action by web server 404 or the advertiser may be taken (e.g., canceling a contract or punishing the relevant party). For example, if web server 404 learns that it is only receiving payment for 10% of the advertisements being displayed, web server 404 may cancel the contract with the ISP 402 inserting the advertisements or cancel the contract with the advertiser. Alternatively, web server 404 may punish ISP 402 by increasing the advertisement cost by 10% for any advertisements inserted by ISP 402. Similarly, if the advertiser learns that there are 5% mismatches, the advertiser may pay 5% less to ISP 402 or web server 404. As a result of the ability to cross check the information maintained by the various entities (e.g., client 400, ISP 402, and web server 404), two or more parties would have to conspire together to defraud a third party of profits. In the prior art, such collusion was not necessary (i.e., one party alone could defraud another of profits because no cross verification system was available).

Verification is also needed to determine if the demographics supplied by the ISP are accurate. Such verification is particularly useful when the cost of the advertisement is dependent on the demographics (e.g., a Mercedes or Jaguar advertiser may pay more if the client lives in a wealthy area). This verification may be performed by independent auditors that examine, test, and evaluate the demographic system (i.e., the computer software used to implement the Online Profile Management System 300 of FIG. 3) and the profile maintained by the ISP to determine. The independent auditors evaluate and test the software to determine if the method for obtaining and determining the information, and inserting a particular advertisement is reliable.

Thus, a method and apparatus for local advertising on the internet is described in conjunction with one or more specific embodiments. The invention is defined by the claims and their full scope of equivalents.

What is claimed is:

1. A method of advertising using a computer system comprising:

obtaining at least one user request at an Internet Service Provider from a known user of said Internet Service Provider, wherein said known user is a client of said Internet Service Provider;

obtaining information to be displayed to said known user from a first source, wherein said information to be displayed comprises information obtained in response to said at least one user request;

maintaining a history of all said information obtained in response to said at least one user request by said known user;

developing profile information relating to said known user from said history of all said information obtained in response to said at least one user request;

obtaining a first advertisement from said first source;

associating said first advertisement with said information to be displayed, wherein said associating said first advertisement is performed by said Internet Service Provider;

transmitting said information to be displayed to said known user;

transmitting said first advertisement to an advertisement slot of said known user;

said Internet Service Provider using said profile information for negotiating a cost for and selling said advertisement slot for at least one second advertisement to a second source without intervention from said known user;

said Internet Service Provider obtaining said at least one second advertisement from said second source;

associating said at least one second advertisement with said information to be displayed, wherein said associating said at least one second advertisement is performed by said Internet Service Provider;

transmitting said at least one second advertisement to said advertisement slot.

2. The method of claim 1 wherein said information to be displayed is a web page.

3. The method of claim 2 wherein said associating said at least one second advertisement with said information further comprises said Internet Service Provider initiating said negotiation for a cost for associating said at least one second advertisement with said information.

4. The method of claim 2 further comprising a web server initiating said negotiation for a cost for associating said at least one second advertisement with said information.

5. The method of claim 2 wherein said advertisement slot is identified by an HTML tag.

6. The method of claim 2 wherein said profile information comprises information regarding web pages displayed to said client.

7. The method of claim 6 wherein said profile information indicates an interest in a competitor of a topic of said second advertisement.

8. The method of claim 2 wherein said profile information comprises demographic information of said client.

9. The method of claim 2 wherein said profile information comprises personal information of said client.

10. The method of claim 2 wherein said profile information comprises network accesses of said client.

11. The method of claim 2 wherein said obtaining said at least one second advertisement is based on information comprising a mapping of profile information to an advertisement.

12. The method of claim 2 wherein a client contains said advertisement slot.

13. The method of claim 12 further comprising verifying that said second advertisement was transmitted to said client.

14. The method of claim 13 wherein said verifying step is by sampling.

15. the method of claim 13 wherein said verifying step comprises comparing a server's log to said Internet Service Provider's log.

16. The method of claim 2 further comprising:
obtaining an IP address and port number; mapping said IP address and port number to a unique user identifier; and
utilizing said unique user identifier to map said profile information to a specific client.

17. the method of claim 1 further comprising obtaining said at least one second advertisement from an advertiser.

18. The method of claim 1 wherein said at least one second advertisement is stored in cache.

19. The method of claim 1 wherein said cost is based on a size of said advertisement.

20. The method of claim 1 wherein said cost is based on a location of said advertisement slot.

21. The method of claim 1 wherein said cost is based on a number of advertisements to be inserted.

22. The method of claim 1 wherein said cost is based on whether additional advertisements are to be displayed.

23. The method of claim 1 wherein said advertisement is associated with said information to be displayed based on a cost of said advertisement.

24. The method of claim 1 wherein said profile information comprises a time period that each of said information to be displayed is displayed.

25. The method of claim 1 further comprising maintaining said profile information transparent to said user.

26. The method of claim 1 wherein said profile information comprises user behavior patterns.

27. The method of claim 26 further comprising deriving said user behavior patterns from said at least one user request.

28. A method of advertising using a computer system comprising:
obtaining at least one user request at an Internet Service Provider from a known user of said Internet Service Provider, wherein said known user is a client of said Internet Service Provider;
obtaining information to be displayed from a first source, wherein said information to be displayed comprises information obtained in response to said at least one user request, and wherein said information further comprises identification of a location for displaying at least one advertisement;
developing profile information related to said at least one user request from information relating to said known user maintained by said Internet Service Provider;
obtaining a first advertisement from said first source;
associating said first advertisement with said information to be displayed, wherein said associating said first advertisement is performed by said Internet Service Provider, and wherein said associating said first advertisement further comprises inserting said first advertisement into said location;
transmitting said information to be displayed;
transmitting said first advertisement;
displaying said information to be displayed;
displaying said first advertisement in said location;
said Internet Service Provider using said profile information for negotiating a cost and for selling said location for at least one second advertisement with said information to be displayed to a second source without intervention from said known user;
said Internet Service Provider obtaining said at least one second advertisement from said second source;
associating said at least one second advertisement with said information to be displayed, wherein said associating said at least one second advertisement is performed by said Internet Service Provider, and wherein said associating said at least one second advertisement further comprises inserting said second advertisement into said location;
transmitting said second advertisement; and
displaying said second advertisement in said location.

29. The method of claim 28 wherein said information to be displayed is a web page.

30. The method of claim 29 wherein said second source is said Internet Service Provider.

31. The method of claim 29 further comprising said Internet Service Provider initiating said negotiation for a cost for associating said advertisement.

32. The method of claim 29 further comprising a web server initiating said negotiation for a cost for associating said advertisement.

33. The method of claim 29 wherein said location for displaying said advertisement is identified by an HTML tag.

34. The method of claim 29 wherein said profile information comprises information regarding web pages displayed to said client.

35. The method of claim 34 wherein said profile information indicates an interest in a competitor of a topic of said advertisement.

36. The method of claim 29 wherein said profile information comprises demographic information of said client.

37. The method of claim 29 wherein said profile information comprises personal information of said client.

38. The method of claim 29 wherein said profile information comprises network accesses of said client.

39. The method of claim 29 wherein said obtaining said advertisement is based on information comprising a mapping of profile information to an advertisement.

40. The method of claim 29 wherein a client contains said advertisement slot.

41. The method of claim 40 further comprising verifying that said advertisement was transmitted to said client.

42. The method of claim 41 wherein said verifying step is by sampling.

43. The method of claim 41 wherein said verifying step comprises comparing a server's log to a log of said proxy.

44. The method of claim 29 further comprising:
obtaining an IP address and port number; mapping said IP address and port number to a unique user identifier; and
utilizing said unique user identifier to map said profile information to a specific client.

45. The method of claim 28 wherein said second source is an advertiser.

46. The method of claim 28 wherein said advertisement is stored in cache.

47. The method of claim 28 wherein said cost is based on a size of said advertisement.

48. The method of claim 28 wherein said cost is based on a location of said available space.

49. The method of claim 28 wherein said cost is based on a number of advertisements to be inserted.

50. The method of claim 28 wherein said cost is based on whether additional advertisements are to be displayed.

51. The method of claim 28 wherein said advertisement is associated based on a cost of said advertisement.

52. A system comprising:
a processor;
a memory coupled to said processor;
code executed by said processor, wherein said code is configured to transmit advertisements;
said code, when executed by said processor, performs the steps of:
obtaining at least one user request at a Internet Service Provider from a known user of said Internet Service Provider, wherein said known user is a client of said Internet Service Provider;
obtaining information to be displayed to said known user from a first source, wherein said information to be displayed comprises information obtained in response to said at least one user request;
developing profile information related to said at least one user request from information relating to said known user maintained by said Internet Service Provider;
obtaining a first advertisement from said first source;
associating said first advertisement with said information to be displayed, wherein said associating said first advertisement is performed by said Internet Service Provider;
transmitting said information to be displayed;
transmitting said first advertisement to an advertisement slot;
said Internet Service Provider using said profile information for negotiating a cost and selling said advertisement slot for at least one second advertisement to a second source without intervention from said known user;
said Internet Service Provider obtaining said at least one second advertisement from said second source, wherein said at least one second advertisement is based on said profile information;
associating said at least one second advertisement with said information to be displayed, wherein said method of associating said at least one second advertisement is performed by said Internet Service Provider; and
transmitting said at least one second advertisement to said advertisement slot.

53. The system of claim 52 wherein said information to be displayed is a web page.

54. The system of claim 53, wherein a client contains said advertisement slot.

55. The method of claim 52 wherein said profile information comprises a time period that each of said information to be displayed is displayed.

56. The method of claim 52 further comprising maintaining said profile information transparent to said user.

57. The method of claim 52 wherein said profile information comprises user behavior patterns.

58. The method of claim 67 further comprising deriving said user behavior patterns from said at least one user request.

59. A system comprising:
a processor;
a memory coupled to said processor;
code executed by said processor, wherein said code is configured to transmit advertisements;
said code, when executed by said processor, performs the steps of:
obtaining at least one user request at a Internet Service Provider from a known user of said Internet Service Provider, wherein said known user is a client of said Internet Service Provider;
obtaining information to be displayed from a first source, wherein said information to be displayed to said known user comprises information obtained in response to said at least one user request, and wherein said information further comprises identification of a location for displaying at least one advertisement;
developing profile information related to said at least one user request from information relating to said known user maintained by said Internet Service Provider;
obtaining a first advertisement from said first source;
associating said first advertisement with said information to be displayed, wherein said associating said first advertisement is performed by said Internet Service Provider, and wherein said associating said first advertisement further comprises inserting said first advertisement into said location;
transmitting said information to be displayed;
transmitting said first advertisement to an advertisement slot;
displaying said information to be displayed;
displaying said first advertisement in said location;
said Internet Service Provider using said profile information for negotiating a cost for and selling said advertisement slot for at least one second advertisement to a second source without intervention from said known user;
said Internet Service Provider obtaining said at least one second advertisement from said second source, wherein said at least one second advertisement is based on said profile information;
associating said at least one second advertisement with said information to be displayed, wherein said method of associating said at least one second advertisement is performed by said Internet Service Provider, and wherein said method of associating said at least one second advertisement further comprises inserting said second advertisement into said location;
transmitting said at least one second advertisement to said advertisement slot; and
displaying said second advertisement in said location.

60. The system of claim 59 wherein said information to be displayed is a web page.

61. The system of claim 57, wherein a client contains said advertisement slot.

62. A computer program product comprising:
a computer usable medium having computer readable program code embodied therein configured to advertise, said computer program product comprising:
computer executable code configured to cause a computer to obtain at least one user request at a Internet Service Provider from a known user of said Internet Service Provider, wherein said known user is a client of said Internet Service Provider;
computer executable code configured to cause a computer to obtain information to be displayed to said known user from a first source, wherein said information to be displayed comprises information obtained in response to said at least one user request;
computer executable code configured to cause a computer to develop profile information related to said at least one user request from information relating to said known user maintained by said Internet Service Provider;
computer readable code configured to cause a computer to obtain a first advertisement;
computer executable code configured to cause a computer to associate said first advertisement with said information to be displayed, wherein said association of said first advertisement is performed by said Internet Service Provider;
computer executable code configured to cause a computer to transmit said information to be displayed;
computer executable code configured to cause a computer to transmit said first advertisement to an advertisement slot;
computer executable code configured to cause said Internet Service Provider to use said profile information to negotiate a cost for and selling said advertisement slot for at least one second advertisement to a second source without intervention from said known user;
computer executable code configured to cause said Internet Service Provider to obtain said at least one second advertisement from said second source, wherein said at least one second advertisement is based on said profile information;
computer executable code configured to cause a computer to associate said at least one second advertisement with said information to be displayed, wherein said association of said at least one second advertisement is performed by said Internet Service Provider; and
computer executable code configured to cause a computer to transmit said at least one second advertisement to said advertisement slot.

63. The computer program product of claim 62 wherein said information to be displayed is a web page.

64. The computer program product of claim 63, further comprising computer readable code configured to cause a computer to provide said information to be displayed and said second advertisement to a client.

65. The method of claim 62 wherein said profile information comprises a time period that said information to be displayed is displayed.

66. The method of claim 62 further comprising maintaining said profile information transparent to said user.

67. The method of claim 62 wherein said profile information comprises user behavior patterns.

68. The method of claim 67 further comprising deriving said user behavior patterns from said at least one user request.

69. A computer program product comprising:
a computer usable medium having computer readable program code embodied therein configured to advertise, said computer program product comprising:
computer executable code configured to cause a computer to obtain at least one user request at a Internet Service Provider from a known user of said Internet Service Provider, wherein said known user is a client of said Internet Service Provider;
computer executable code configured to cause a computer to obtain information to be displayed to said known user from a first source, wherein said information to be displayed comprises information obtained in response to said at least one user request, and wherein said information further comprises identification of a location for displaying at least one advertisement;
computer executable code configured to cause a computer to develop profile information related to said at least one user request from information relating to said known user maintained by said Internet Service Provider;
computer executable code configured to cause a computer to obtain a first advertisement from said first source;
computer executable code configured to cause a computer to associate said first advertisement with said information to be displayed, wherein said association of said first advertisement is performed by said Internet Service Provider, and wherein said association of said first advertisement further comprises inserting said first advertisement into said location;
computer executable code configured to cause a computer to transmit said information to be displayed;
computer executable code configured to cause a computer to transmit said first advertisement to an advertisement slot;
computer executable code configured to cause a computer to display said information to be displayed;
computer executable code configured to cause a computer to display said first advertisement in said location;
computer executable code configured to cause said Internet Service Provider to use said profile information to negotiate a cost for and selling said location for at least one second advertisement to a second source without intervention from said known user;
computer executable code configured to cause said Internet Service Provider to obtain said at least one second advertisement from said second source, wherein said at least one second advertisement is based on said profile information;
computer executable code configured to cause a computer to associate said at least one second advertisement with said information to be displayed, wherein said association of said at least one second advertisement is performed by said Internet Service Provider, and wherein said association of said at least one second advertisement further comprises inserting said second advertisement into said location;
computer executable code configured to cause a computer to transmit said at least one second advertisement to said advertisement slot; and
computer readable code configured to cause a computer to display said second advertisement in said location.

70. The computer program product of claim 69 wherein said information to be displayed is a web page.

* * * * *